United States Patent [19]
Koenig, Jr. et al.

[11] Patent Number: 5,740,642
[45] Date of Patent: Apr. 21, 1998

[54] DRYWALL CORNER-TRIMMING ASSEMBLY RESISTING BUTT-EDGE SEPARATION

[75] Inventors: Joseph M. Koenig, Jr., Lincolnwood; Leopold Budzik; Mark Budzik, both of Niles, all of Ill.

[73] Assignee: Trim-Tex, Inc., Lincolnwood, Ill.

[21] Appl. No.: 609,848

[22] Filed: Mar. 1, 1996

[51] Int. Cl.[6] ........................ E04B 2/72
[52] U.S. Cl. ............ 52/255; 52/288.1; 52/726.1; 403/267; 403/294; 403/402
[58] Field of Search ............ 52/287.1, 288.1, 52/254, 255, 256, 257, 417, 216, 726.1; 403/292, 293, 294, 298, 401, 402, 265, 266, 267

[56] References Cited

U.S. PATENT DOCUMENTS

| Re. 34,547 | 2/1994 | Weldy | 52/288.1 |
|---|---|---|---|
| 1,430,508 | 9/1922 | Johnson | 52/256 |
| 3,742,668 | 7/1973 | Oliver | 52/288.1 |
| 3,956,861 | 5/1976 | Rasmussen | 52/287 |
| 4,436,343 | 3/1984 | Schneider | 403/267 |
| 4,569,171 | 2/1986 | Kuhr et al. | 52/242 |
| 4,642,957 | 2/1987 | Edwards | 52/242 |
| 5,001,877 | 3/1991 | Edwards | 52/288 |
| 5,003,743 | 4/1991 | Bifano et al. | 52/282 |
| 5,179,811 | 1/1993 | Walker et al. | 52/287 |
| 5,233,804 | 8/1993 | Miller | 52/288.1 |
| 5,350,227 | 9/1994 | Katz | 312/198 |
| 5,398,469 | 3/1995 | Logan | 52/288.1 |
| 5,457,923 | 10/1995 | Logan et al. | 52/288.1 |
| 5,531,051 | 7/1996 | Chenier, Jr. et al. | 52/257 |
| 5,544,463 | 8/1996 | Bergin | 52/288.1 |

*Primary Examiner*—Michael Safavi
*Attorney, Agent, or Firm*—Dressler, Rockey, Milnamow & Katz, Ltd.

[57] ABSTRACT

In a drywall corner-trimming assembly providing a "bullnose" configuration, two corner-trimming members and a splice are combined. Each member has a central portion and two flanged portions. The central portion has a generally arcuate profile. Each of the flanged portions extends from one of the lateral edges of the central portion at a step defining a lateral limit of a concave surface of the central portion. The members and the splice are assembled so that the splice straddles such members, so that a portion of one of the expansive surfaces of the splice faces the concave surface of the central portion of each of such members, so that the splice is concealed at least substantially by the central portions of such members are viewed, and so that each of the lateral edges of the elongate splice is pressed firmly against the step at one of the lateral edges of the central portion of each of said members. The splice is secured adhesively to the members, as by adhesive ribbons.

8 Claims, 2 Drawing Sheets

U.S. Patent        Apr. 21, 1998        Sheet 1 of 2        5,740,642
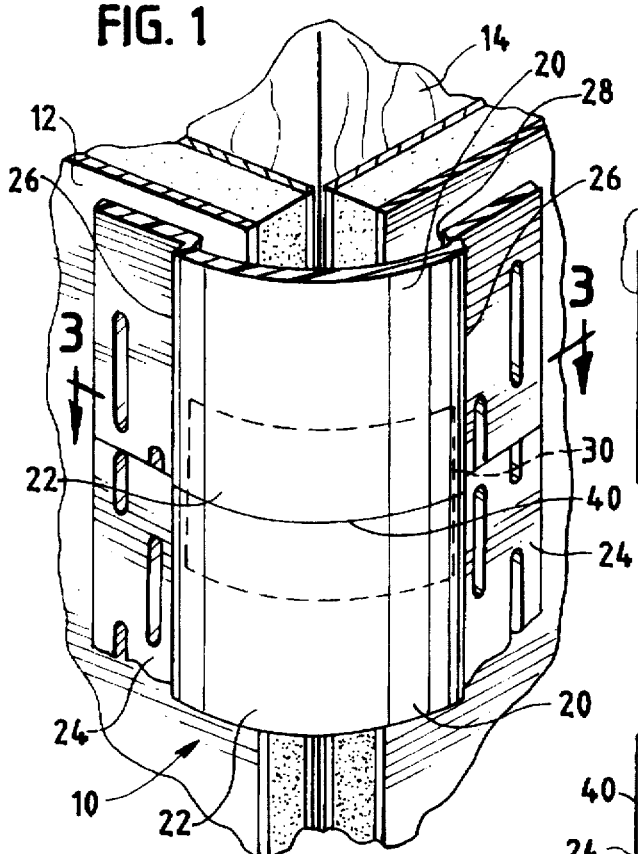
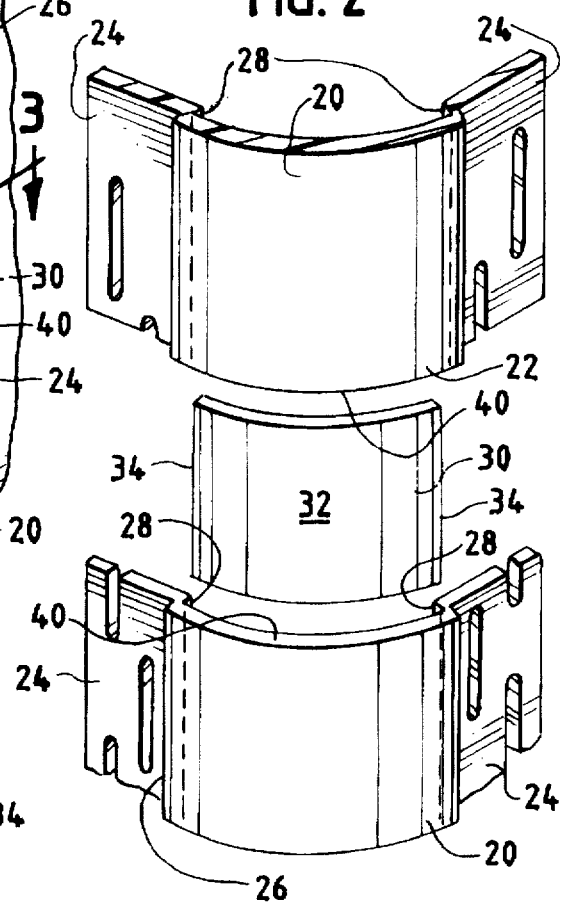
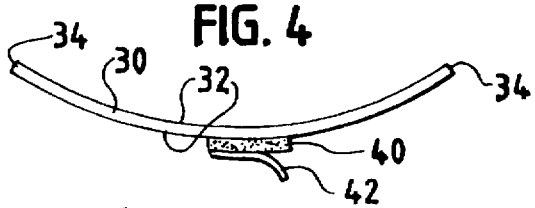
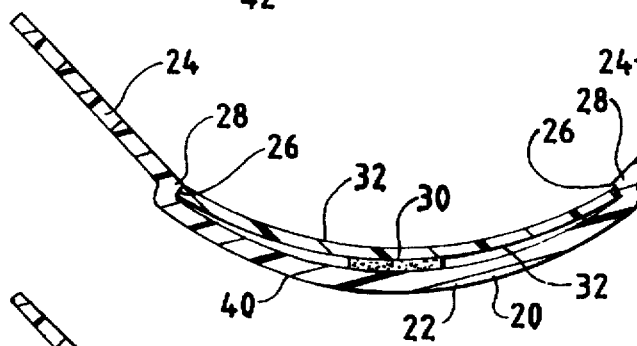
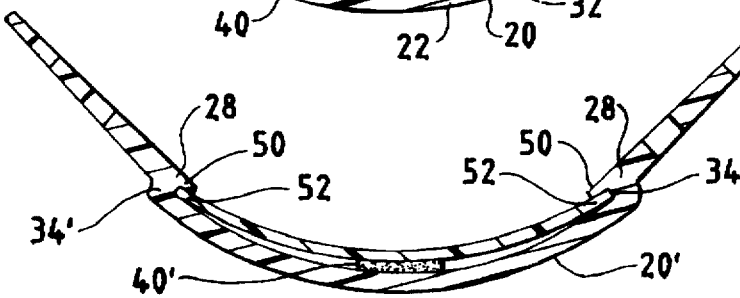

DRYWALL CORNER-TRIMMING ASSEMBLY RESISTING BUTT-EDGE SEPARATION

TECHNICAL FIELD OF THE INVENTION

This invention pertains to a drywall corner-trimming assembly comprising two corner-trimming members approximating each other at one end of each member, as used for trimming a corner defined by two drywall panels, particularly but not exclusively to provide a so-called "bullnose" configuration having an exterior radius of at least about three-fourths inch. According to this invention, a splice is employed to align the approximating members, which may be drywall corner-trimming strips, and to resist butt-edge separation of such members.

BACKGROUND OF THE INVENTION

In residential construction and commercial construction, it is common to employ a straight corner-trimming strip (corner bead) to trim a corner where two drywall panels approximate each other at a right angle or at an obtuse angle. Commonly, such a trimming strip is extruded from a suitable polymer, such as polyvinyl chloride. Commonly, such a trimming strip has a central portion having two lateral edges and two flanged portions, each of which extends from one of the lateral edges of the central portion. When such a trimming strip is installed, the flanged portions are secured to the drywall panels, as by staples or by an adhesive.

If the trimming strip is designed to provide the trimmed corner with a so-called "bullnose" configuration, the central portion has a generally arcuate profile defining a concave surface and a convex surface, and the convex surface has an exterior radius of at least about three-fourths inch. The generally arcuate profile may encompass from about 45° to about 135°. Moreover, each of the flanged portions extends from the one of the lateral edges of the central portion at a step, which defines a lateral limit of the concave surface of the central portion.

Such straight "bullnose" corner-trimming strips are supplied in standard lengths, such as eight, ten, or twelve feet, and are cut to shorter lengths depending upon requirements of each installation. Such straight "bullnose" corner-trimming strips (corner beads) extruded from polyvinyl chloride are available commercially from Trim-Tex, Inc. of Lincolnwood, Ill., under its TRIM-TEX trademark.

As a common expedient to avoid wastage or so as to deal with long corners, two or more relatively short, straight corner-trimming strips approximating one other at adjacent ends, which may be called butt edges, are employed where a relatively long corner-trimming strip would be otherwise needed. In some applications, such an expedient can be quite unsatisfactory, as it can be very difficult to avoid rotational misalignment of the approximating strips about an axis defined by the generally arcuate profiles of the central portions when the flanged portions are secured to the drywall panels.

Commonly, such straight "bullnose" corner-trimming strips are employed with two-legged (two-way) "bullnose" corners and with three-legged (three-way) "bullnose" corners. Commonly, such two-legged and three-legged "bullnose" corners are molded so as to have arcuate tongues, which extend from their respective legs and which are designed to slip beneath such straight outside-corner trimming strips. Such two-legged (two-way) and three-legged (three-way) "bullnose" corners molded from polyvinyl chloride are available commercially from Trim-Tex, Inc. of Lincolnwood, Ill., under its TRIM-TEX trademark. Similar "bullnose" corners are disclosed in Weldy et al. U.S. Pat. Re. 34,547. Because such straight "bullnose" corner trimming strips are extruded in standard lengths and are cut to shorter lengths depending upon requirements of each installation, it is not practical to provide molded tongues on the ends of such strips.

Heretofore, so as to resist rotational misalignment, it has been suggested by another to splice such straight "bullnose" corner-trimming strips with generally arcuately profiled splices, which are cut from the center portions of similar strips and which help to align such strips.

Besides rotational misalignment, another problem that can occur with such straight "bullnose" corner-trimming strips and with such two-legged and three-legged "bullnose" corners is so called "butt-edge separation" which refers to separation that can occur at the ends where such strips approximate each other or where such a strip approximates one leg of such a corner, and which can lead to unsightly conditions, such as cracked paint.

Heretofore, so as to resist butt-edge separation, it has been known to splice drywall-trimming strips of another type having generally sharp-cornered profiles defining flat interior and exterior surfaces with flat splices, which are secured adhesively to the flat interior surfaces of such strips where such strips approximate one another.

SUMMARY OF THE INVENTION

This invention provides a drywall corner-trimming assembly, which is useful for trimming a corner defined by two drywall panels, particularly but not exclusively to provide a so-called "bullnose" configuration having an apparent radius of at least about three-fourths inch. The assembly comprises two corner-trimming members approximating each other at one end of each member and a splice, which is employed to align the approximating members.

Being similar to known "bullnose" corner-trimming strips or to the legs of known two-legged or three-legged "bullnose" corners, each member has a central portion and two flanged portions. The central portion has a generally arcuate profile defining a concave surface with an interior radius and a convex surface with an exterior radius and has two lateral edges. Each of the flanged portions extends from one of the lateral edges of the central portion at a step defining a lateral limit of the concave surface of the central portion. The splice has two expansive surfaces and two lateral edges.

If the ends at which the members approximate each other define generally right angles with the lateral edges of the central portions of the approximating members, the approximating members are aligned generally with each other. It is contemplated that the ends at which the members approximate each other may have bevelled edges, whereby the approximating members define a right-angled or other corner.

The approximating members and the splice are assembled so that the splice straddles such members, so that a portion of one of the expansive surfaces of the splice faces the concave surface of the central portion of each of such members, so that the splice is concealed at least substantially by the central portions of such members when the convex surfaces of the central portions of such members are viewed, and so that each of the lateral edges of the elongate splice is pressed firmly against the step at one of the lateral edges of the central portions of each of such members, whereby the lateral edges of the central portions of such members are aligned by the splice. Having the lateral edges pressed firmly against the steps, the splice prevents rotational misalignment of the approximating members about the axis noted above.

Preferably, so that the lateral edges are pressed against the steps, the splice is stressed into a generally arcuate profile between the steps at the lateral edges of the central portions of the approximating members. Preferably, the splice is secured adhesively to such members in adhesive areas near the lateral edges of the central portions of such members and near the lateral edges of the splice, by adhesive ribbons near those edges or by a sprayed-on adhesive. Being secured adhesively to such members, the splice resists butt-edge separation at the ends where such members approximate each other.

Each of the approximating members may have two flanges with each flange defining a groove and extending from one of the steps, toward the other flange, whereupon each of the lateral edges of the splice is pressed firmly into one of the grooves.

This invention also provides a drywall corner-trimming assembly comprising a first corner-trimming member having an end with a bevelled edge, a second corner-trimming member having an end with a bevelled edge, and a splice, in a novel arrangement wherein the first and second members approximate each other at the ends with the bevelled edges so as to define a corner.

As used in the novel arrangement, each member has a central portion and two flanged portions, and the central portion and at least one of the flanged portions are bevelled at the end with the bevelled edge of such member. Moreover, the central portion has two lateral edges and a generally arcuate profile defining a concave surface, and each flanged portion extends from one of the lateral edges of the central portion.

As used in the novel arrangement, the splice has a first portion and a second portion. The first and second portions are joined to each other at a bevelled juncture so as to define a corner conforming generally to the corner defined by the approximating members. Each of the first and second portions has a generally arcuate profile defining a convex surface.

In the novel arrangement, the approximating members and the splice are assembled so that the splice straddles the members, so that the convex surface of the first portion of the splice is disposed between the lateral edges of the concave portion of the first member, so that the convex surface of the first portion of the splice is secured adhesively to the concave surface of the central portion of the first member, so that the convex surface of the second portion of the splice is disposed between the lateral edges of the concave portion of the second member, and so that the convex surface of the second portion of the splice is secured adhesively to the concave surface of the central portion of the second member.

Preferably, in the novel arrangement, the drywall corner-trimming assembly further comprises adhesive ribbon means securing the convex surface of the first portion of the splice adhesively to the concave surface of the central portion of the first member and securing the convex surface of the second portion of the splice adhesively to the concave surface of the central portion of the second member.

Hereinbefore and hereinafter, and in the appended claims, all references to a corner-trimming member are intended to refer either to a corner-trimming strip or to one leg of a two-legged or three-legged corner, as discussed above.

These and other objects, features, and advantages of this invention are evident from the following description of a preferred embodiment of this invention, with reference to the accompanying drawings.

BRIEF DESCRIPTION OF THE DRAWINGS

FIG. 1 is a fragmentary, assembled, perspective view of a building structure comprising a wooden stud, two drywall panels defining an outside, vertical corner, and a drywall corner-trimming assembly according to a preferred embodiment of this invention and comprising two straight corner trimming-strips and a splice.

FIG. 2 is a fragmentary, exploded, perspective view of the straight corner trimming-strips and the splice.

FIG. 3 is a cross-sectional view of the drywall corner-trimming assembly, as taken along line 3—3 of FIG. 1, in a direction indicated by arrows.

FIG. 4 is an end view of the splice, as provided on a convex surface with two adhesive ribbons, one along each of its lateral edges.

FIG. 5 is a cross-sectional view of a drywall corner-trimming assembly according to an alternative embodiment of this invention.

DETAILED DESCRIPTION OF THE ILLUSTRATED EMBODIMENTS

Figure 6:
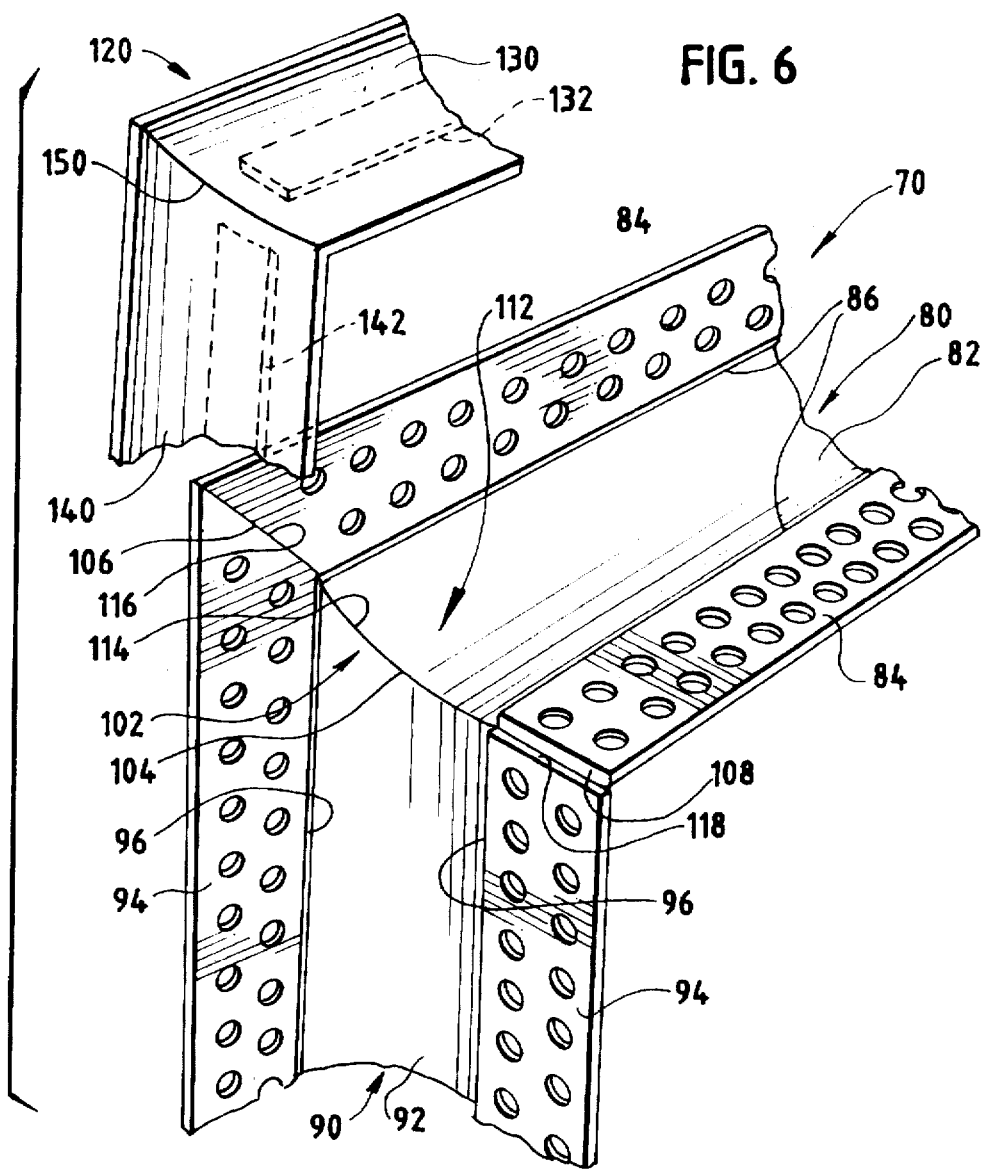
FIG. 6 is a fragmentary, perspective, partly exploded view of two straight corner-trimming strips and a splice, in a novel assembly arrangement according to an alternative embodiment of this invention.

As shown in FIGS. 1 through 5, a drywall corner-trimming assembly 10, which is employed for trimming an outside, vertical corner where two drywall panels 12 mounted to a wooden stud 14 approximate each other at a right angle, constitutes a preferred embodiment of this invention. Broadly, the assembly 10 comprises two straight "bullnose" corner-trimming strips 20 approximating each other at one end of each of the strips 20 and a splice 30, which is employed to join the strips 20.

The strips 20 are regarded as approximating each other if positioned so as to touch each other at one end of each strip 20, as shown, or so as to be approximately touching each other at one end of each strip 20, preferably with no more than a small gap (e.g. no more than a few millimeters) between their approximately touching ends.

As shown, each strip 20 has a central portion 22 and two flanged portions 24, each of which has a pattern of punched slots to promote adherence of drywall-finishing material. The central portion 22 of each strip 20 has a generally arcuate profile defining a concave surface with an interior radius and a convex surface with an exterior radius and has two lateral edges 26. Each of the flanged portions 24 of each strip 20 extends from one of the lateral edges 26 of the central portion 22 of such strip 20 at a step 28 defining a lateral limit of the concave surface of the central portion 22 of such strip 20.

When the strips 20 are installed, the flanged portions 24 are secured to the drywall panels 12, as by staples (not shown) or by a sprayed-on adhesive. The strips 20 are extruded from a suitable polymer, such as polyvinyl chloride, and are similar to the commercially available "bullnose" corner-trimming strips (corner beads) discussed above. So as to facilitate painting, the trimming strips 20 may be pre-primed on their surfaces that are to be later painted, as discussed below.

As shown, the splice 30 has two expansive surfaces 32 and two lateral edges 34. The splice 30 is extruded from a suitable polymer, such as polyvinyl chloride, so as to have a generally arcuate profile, as shown in FIG. 4, when unstressed or so as to be generally flat when unstressed.

As shown in FIGS. 1, 2, and 3, the approximating strips 20 and the splice 30 are assembled so that the lateral edges 26 of the central portions 22 of such strips are aligned by the splice so as to prevent rotational misalignment. Specifically, the approximating strips 20 and the splice 30 are assembled so that the splice 30 straddles such strips 20, so that a portion of one of the expansive surfaces 32 of the splice 30 faces the concave surface of the central portion 22 of each of such strips 20, so that the splice 30 is concealed at least substantially by the central portions 22 of such strips 20 when the convex surfaces of the central portions 22 of such strips 20 are viewed, and so that each of the lateral edges 34 of the elongate splice 30 is pressed firmly against the step 28 at one of the lateral edges 26 of the central portion 22 of each of such strips 20. As shown in FIG. 3, so that the lateral edges 34 are pressed firmly against the steps 28, the splice is stressed into a generally arcuate profile between the steps 28 at the lateral edges 34 of the splice 30, the generally arcuate profile defining an exterior radius that is greater than the interior and exterior radii of the central portions 22 of the approximating strips 20.

Moreover, so as to resist butt-edge separation, the splice 30 is secured adhesively to the approximating strips 20 in adhesive areas, which are centered between the lateral edges 26 of the central portions 22 of such strips 20 and between the lateral edges 34 of the splice 30, preferably by adhesive ribbons 40 centered therebetween or alternatively by a sprayed-on adhesive, such as a sprayed-on adhesive used to secure the flanged portions 24 of the strips to the drywall panels 12. Preferably, as shown in FIG. 4, such ribbons 40 are provided by double-sided adhesive tapes applied to the splice 30, centered between the lateral edges 34, and covered by peel-away strips 42, which are peeled away before the assembly 10 is assembled.

After the assembly 10 has been installed, the flanged portions 24 of the strips 20 are finished with drywall finishing material in a known manner, whereupon the trimmed corner may be then painted.

In FIG. 5, in which primed reference numbers refer to elements similar to elements referenced by similar, unprimed reference numbers in FIGS. 1 through 4, a drywall corner-trimming assembly 10' is shown, which constitutes an alternative embodiment of this invention.

In the drywall corner-trimming assembly 10', two straight "bullnose" corner-trimming strips 20' are employed, which are similar to the strips 20 except that each strip 20' is extruded so as to have two lips 50, each lip 50 defining a groove 52 and extending from the step 28' at each of the lateral edges 26' of the central portions 22' of such strip 20'. The lips 50 extend generally toward each other.

Moreover, a splice 30' is employed, which is similar to the splice 30. The splice 30' is stressed into a generally arcuate profile, as the splice 30 is stressed, and each lateral edge 34' of the splice 30' is pressed firmly into one of the grooves 52 when pressed firmly against the nearer step 28'. Furthermore, as in the preferred embodiment, the splice 30' is secured adhesively to the approximating strips 20' by adhesive ribbons, near the lateral edges 26' of the central portions 22' of such strips 20' and near the lateral edges 34' of the splice 30'. Likewise, as in the preferred embodiment, a sprayed-on adhesive may be alternatively used.

Figure 7:
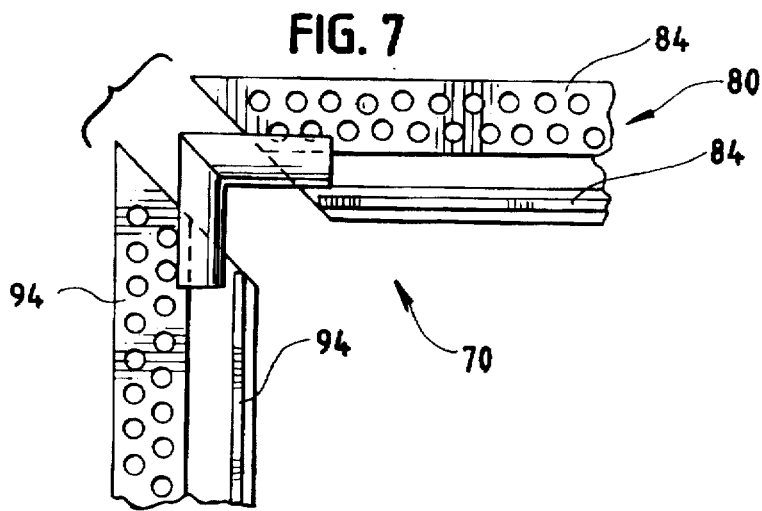
FIG. 7 is a fragmentary, elevational, further exploded view of the approximating strips and the splice, from the novel assembly of FIG. 6.

As shown in FIGS. 6 and 7, a drywall corner-trimming assembly 70, which is employed where several drywall panels (not shown) approximate one another so as to define an upper corner of a doorway or window recess, constitutes an alternative embodiment of this invention. The defined corner may be a right-angled corner, as shown, or an obtuse-angled corner. Broadly, the assembly 70 comprises two straight "bullnose" corner-trimming strips, namely a first strip 80 and a second strip 90, which approximate each other at one end of each of the strips 80, 90, and a splice 120, which is employed to join the strips 80, 90.

The strips 80, 90, are regarded as approximating each other if positioned so as to touch each other at one end of each strip 80, 90, as shown, or so as to be approximately touching each other at one end of each strip 80, 90, preferably with no more than a small gap (e.g. no more than a few millimeters) between their approximately touching ends.

As shown, each strip 80, 90, has a central portion 82, 92, and two flanged portions 84, 94. Each of the flanged portions 84, 94, has a pattern of punched slots to promote adherence of drywall-finishing material. The central portion 82, 80 has a generally arcuate profile defining a concave surface with an interior radius and a convex surface with an exterior radius and has two lateral edges 86, 96.

Except as shown and described, the strips 80, 90, are similar to the strips 20. The flanged portions 84, 94, of the strips 80, 90, are secured to the drywall panels defining the upper corner of the doorway or window recess, as the flanged portions 84, 94, of the strips 20 are secured to the drywall panels 12. As shown, the ends 100, 110, at which the strips 80, 90, approximate each other have bevelled edges.

The bevelled edge 102 of the end 100 of the strip 80 comprises an edge portion 104 at the central portion 82 of the strip 80 and an edge portion 106 at one flanged portion 84, which meets a lateral edge 86 of the central portion 82 of the strip 80 at an obtuse angle. The edge portion 108 of the other flanged portion 84 may be generally perpendicular to the nearer lateral edge 86, as shown, or may be similarly bevelled.

The bevelled edge 112 of the end 110 of the strip 90 comprises an edge portion 114 at the central portion 92 of the strip 90 and an edge portion 116 at one flanged portion 94, which meets a lateral edge 96 of the central portion 92 of the strip 90 at an obtuse angle. The edge portion 118 of the other flanged portion 94 may be generally perpendicular to the nearer lateral edge 86, as shown, or may be similarly bevelled.

As shown, the splice 120 is molded in one piece from a suitable polymer, such as polyvinyl chloride, so as to define a right-angled corner, as shown, or an obtuse-angled corner and so as to have a first portion 130 and a second portion 140, which portions 130, 140, are joined to each other at a bevelled juncture 150 and each of which portions 130, 140, has a generally arcuate profile defining a convex surface. The bevelled juncture 150 conforms generally to the bevelled edges of the ends 100, 110, of the strips 80, 90.

As shown, the approximating strips 80, 90, and the splice 120 are assembled so that the splice 120 straddles the members 80, 90, so that the first portion 130 of the splice 120 is disposed between the lateral edges 86 of the central portion of the first strip 80, so that the convex surface of the first portion 130 of the splice 120 is secured by an adhesive ribbon 132 to the concave surface of the central portion 82 of the first strip 80, so that the second portion 140 of the splice 120 is disposed between the lateral edges 96 of the central portion of the second strip 90, and so that the convex surface of the second portion 140 of the splice 120 is secured by an adhesive ribbon 142 to the concave surface of the central portion 82 of the second strip 90.

Various other modifications may be made in the embodiments discussed above without departing from the scope and spirit of this invention.

We claim:

1. A drywall corner-trimming assembly comprising two corner-trimming members approximating each other at one end of each of the members and comprising a separate splice, each member having a central portion and two flanged portions with the central portion having a generally arcuate profile defining a concave surface and a convex surface and with each flanged portion extending from one of the lateral edges of the central portion at a step defining a lateral limit of the concave surface of the central portion, the splice having two expansive surfaces and two lateral edges, wherein the members and the splice are assembled so that the splice straddles said members, so that one said expansive surface of the splice is convex and the other expansive surface of the splice is concave, so that a portion of the convex surface of the splice faces the concave surface of the central portion of each of the members, and so that the splice is stressed into a generally arcuate profile between the steps, at the lateral edges of the splice, with each of the lateral edges of the splice pressed firmly against the step at one of the lateral edges of the central portion of each of said members, whereby the splice resists butt-edge separation of said members.

2. The drywall corner-trimming assembly of claim 1 wherein the ends at which the members approximate each other define generally right angles with the lateral edges of the central portions of the members so that the members are aligned generally with each other.

3. The drywall corner-trimming assembly of claim 1 wherein the splice is secured adhesively to the central portions of the members.

4. The drywall corner-trimming assembly of claim 2 wherein the splice is secured adhesively to the central portions of the members.

5. The drywall corner-trimming assembly of claim 1 further comprising adhesive ribbon means securing the splice to the central portions of the members.

6. The drywall corner-trimming assembly of claim 2 further comprising adhesive ribbon means securing the splice to the central portions of the members.

7. The drywall corner-trimming assembly of claim 1 wherein each member has two lips, each lip being located where the central portion of said member meets one of the flanged portions of said members, each lip defining a groove and extending from one of the steps, toward the other lip, and wherein each of the lateral edges of the splice is pressed firmly into one of the grooves.

8. A drywall corner-trimming assembly comprising two corner-trimming members approximating each other at one end of each of the members and comprising a separate splice, each member having a central portion and two flanged portions with the central portion having a generally arcuate profile defining a concave surface and a convex surface and with each flanged portion extending from one of the lateral edges of the central portion at a step defining a lateral limit of the concave surface of the central portion, the splice having two expansive surfaces and two lateral edges, each member having two lips, one at each of the flanged portions of said member, each lip defining a groove and extending from one of the steps, toward the other lip, wherein the members and the splice are assembled so that the splice straddles the members, so that a portion of one of the expansive surfaces of the splice faces the concave surface of the central portion of each of the members, so that the splice is stressed into a generally arcuate profile between the steps at the lateral edges of the splice, so that each of the lateral edges of the splice is pressed firmly into one of the grooves, against the step at one of the lateral edges of the central portion of each of said members, and wherein said assembly further comprises adhesive ribbon means securing the splice to the central portions of the members, whereby the splice resists butt-edge separation of the members.

* * * * *